Nov. 14, 1939. K. NUCHTERLEIN 2,180,064
CAMERA
Filed Feb. 3, 1937 4 Sheets-Sheet 1
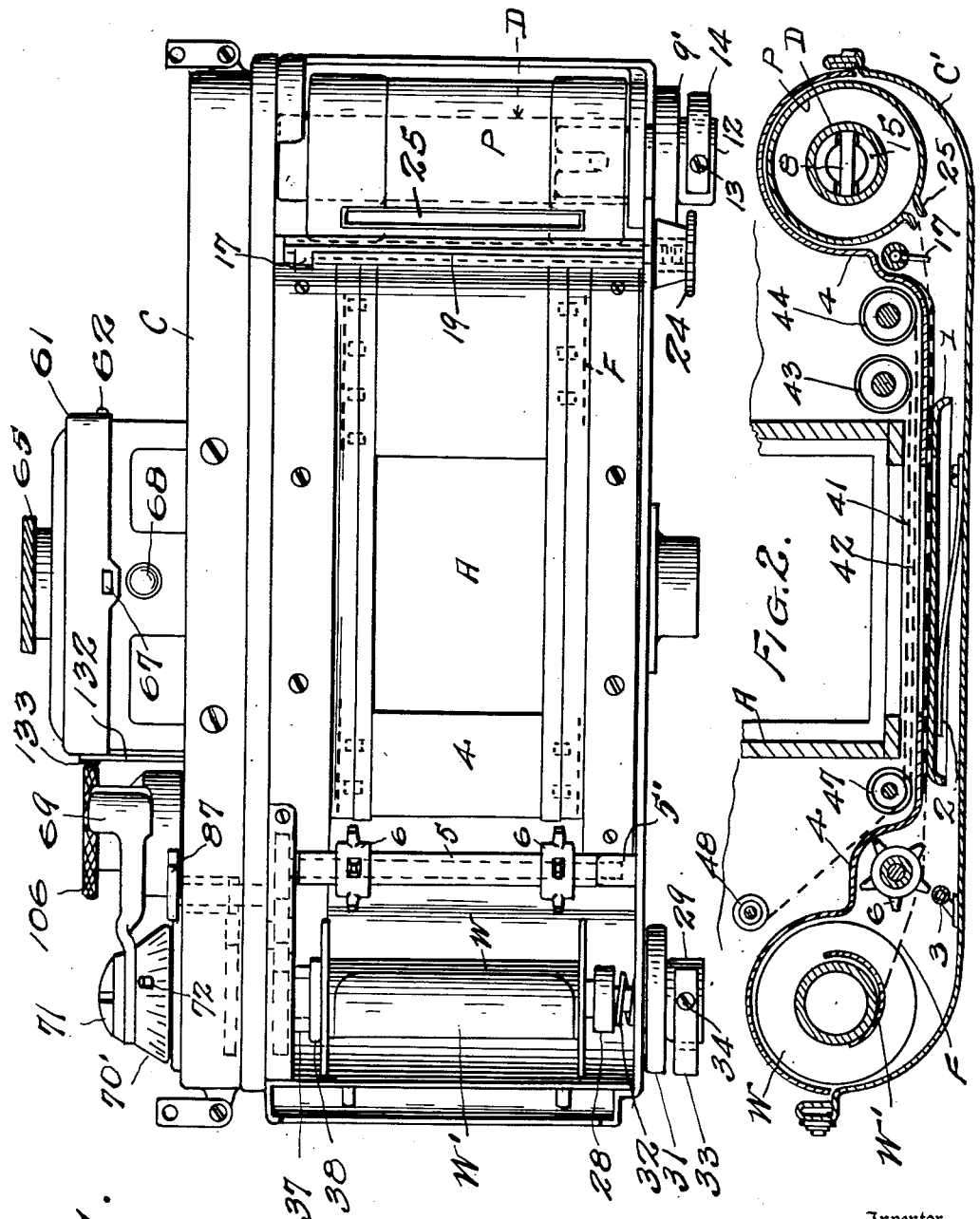
Inventor
KARL NUCHTERLEIN
By Chas. K. Davies & Son
Attorney Nov. 14, 1939. K. NUCHTERLEIN 2,180,064
CAMERA
Filed Feb. 3, 1937 4 Sheets-Sheet 2
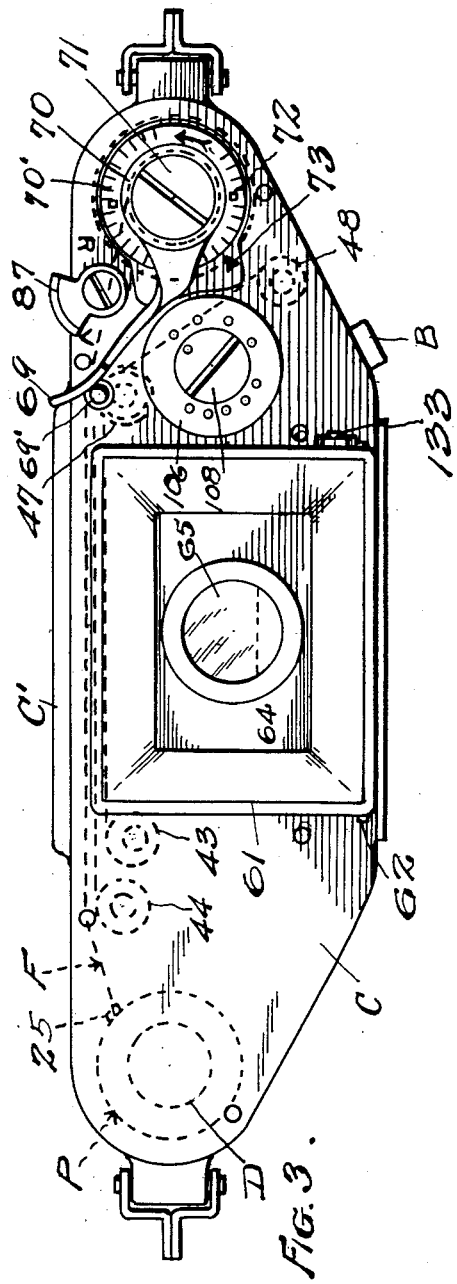
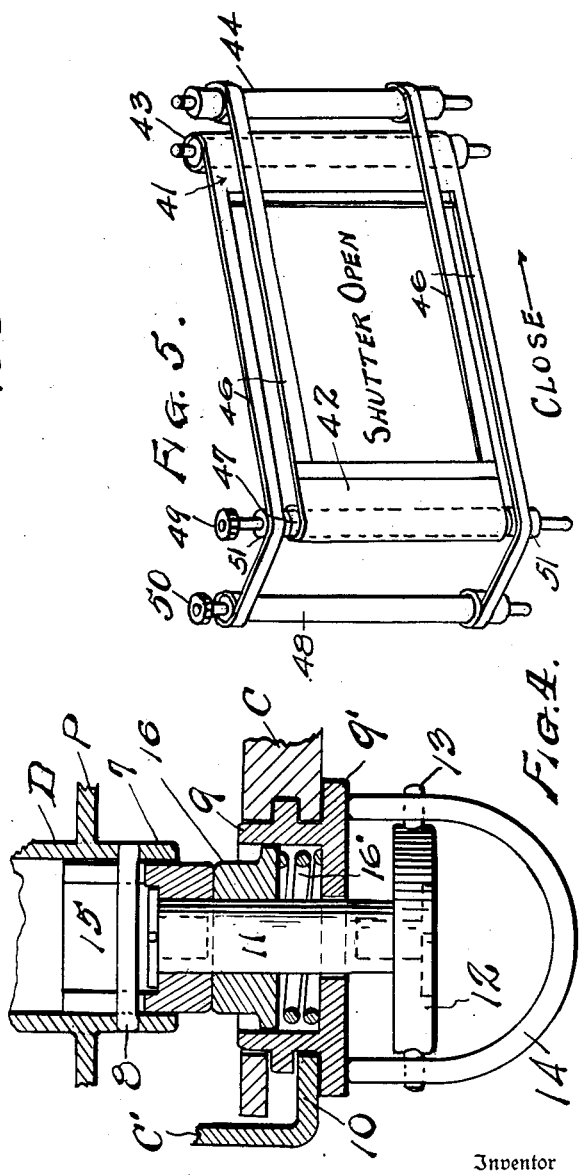
Inventor
KARL NUCHTERLEIN
By Chas. K. Davies & Son
Attorney

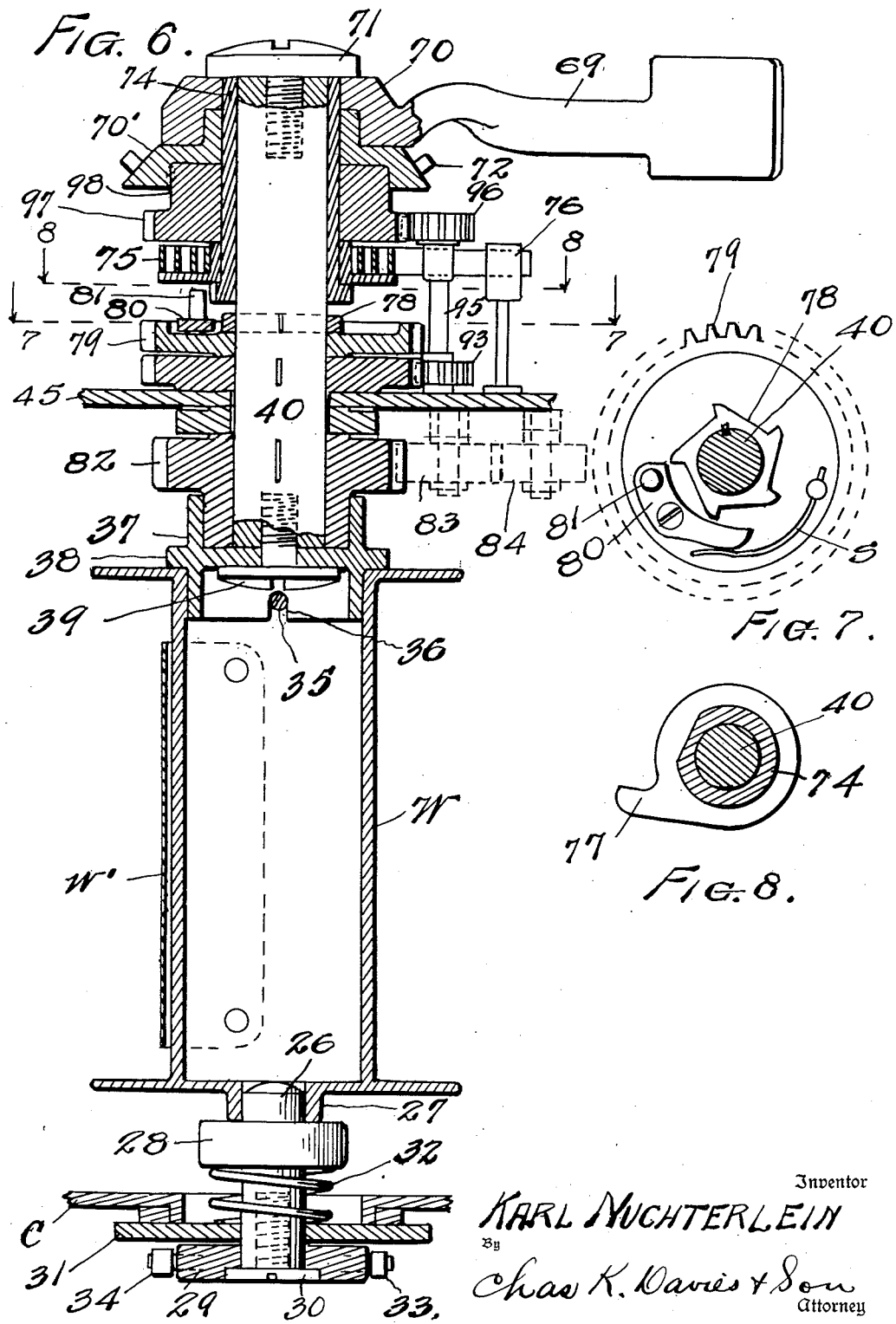

Nov. 14, 1939.  K. NUCHTERLEIN  2,180,064
CAMERA
Filed Feb. 3, 1937  4 Sheets-Sheet 4
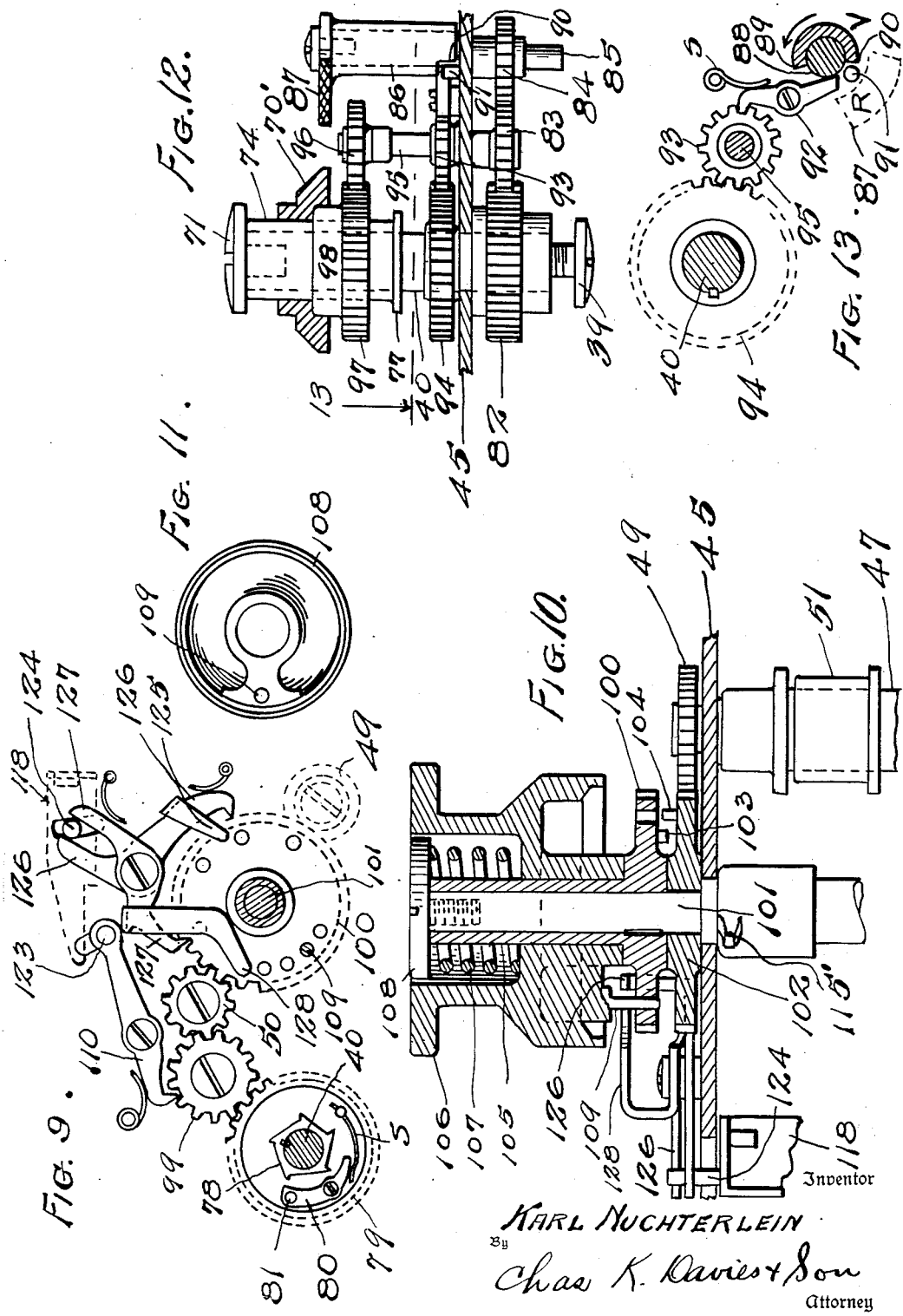

Patented Nov. 14, 1939

2,180,064

UNITED STATES PATENT OFFICE 2,180,064

CAMERA

Karl Nuchterlein, Dresden, Germany, assignor to Ihagee Kamerawerk Steenbergen & Company, Dresden, Germany Application February 3, 1937, Serial No. 123,904
In Germany March 28, 1936

8 Claims. (Cl. 95—31)

My present invention relates to improvements in cameras of the reflex type, utilizing a roll-film and pack of standard make, and an automatically winding curtain-shutter, together with a combined film-feed mechanism, shutter setting, and mirror setting mechanism under control of a single winding lever; and a single operating lever or push lever which controls the release of the set mechanisms for picture-taking purposes. While my invention is applicable for use in other types of cameras it is especially designed for use in miniature cameras, and the invention involves features of construction and operation that insure simplicity in construction and assembly of parts, together with convenience, accuracy and precision in the taking of pictures.

The present application may be regarded as a parent application from which parts will be divided to form the subjects-matter of divisional applications for patent.

Because of the compact arrangement of the various parts of the camera body and of its operating elements, a comparatively small instrument is assured which may be manipulated with facility and accuracy for high-speed work, instantaneous exposures, and for longer time-exposures, in the production of clear-cut photographs, from which, if desired, enlargements may subsequently be made.

I employ automatically operating parts that are spring-controlled, and operated or actuated with precision and reliability and the single winding lever which feeds the film, sets the shutter mechanism, and sets the focusing mirror of the reflex system, automatically springs back to initial position after a single turn or partial turn of the lever.

The single push lever or operating lever employed in releasing the set mechanisms for taking a picture may be operated by manual pressure on a button, by pneumatic or bulb pressure, or in other suitable manner.

In carrying out my improvements I also utilize a dark chamber at the rear of the camera through which the roll-film with its latent images may be re-wound, manually, into the standard film-pack, thus permitting removal of the used roll-film or "daylight spool" from the camera in its original package, without exposure.

As above outlined, the invention consists in certain novel features of construction and operation, and in combinations and arrangements of parts as will hereinafter be more fully set forth and claimed.

In the accompanying drawings I have illustrated one complete example of the physical embodiment of my invention, wherein the parts are combined and arranged according to the best mode I have thus far devised for the practical application of the principles of my invention. It will be understood, however, that changes and alterations may be made in the exemplifying structures, within the scope of my claims, without departing from the principles of my invention.

Figure 1 is an elevation at the rear of the camera, with the detachable back-plate removed to disclose the interior of the dark-chamber for the reversible film, the film-pack and film winding spool, and the foldable hood which is closed.

Figure 2 is a horizontal sectional view at the rear portion of the camera, disclosing the dark-chamber, the film-pack and film winding spool, and indicating by dotted lines the film, and the two automatically spring-wound curtains forming the shutter.

Figure 3 is a top plan view of the camera, with the lens mount omitted, but showing the folded hood with its open-center cover and finder; and also showing the winding-lever, time setting dial, and film-reversing key.

Figure 4 is an enlarged detail view, partly in section showing the lower end of the film-winding spool with its release device, and the latter in released position.

Figure 5 is a perspective view in diagrammatic arrangement showing the two curtains, the winding pinions, and the two automatic spring-wound curtain-rollers; the curtains form the shutter, and the latter is illustrated, for convenience, in open position.

Figure 6 is an enlarged, detail, vertical sectional view of the film-winding and shutter-setting head, together with the film-winding spool.

Figure 7 is a detail sectional view at line 7—7 of Figure 6 disclosing the driving clutch, and Figure 8 is a similar view at line 8—8 showing the complementary clutch head for the clutch-gear of Figure 7.

Figure 9 is a top plan view of the shutter control mechanism, with the driving head, and the timing spindle in section.

Figure 10 is an enlarged vertical sectional view showing the time-setting knob and gears, and also indicating the shafts of the winding rollers for the two curtains of the shutter.

Figure 11 is a detail, inverted, plan view of the hollow time-setting knob of Figure 19.

Figure 12 is a detail elevation of parts of the winding-head shown in Figure 6 (with certain parts omitted to more clearly show other parts), and showing especially the arrangement of the gears for reversing the movement of the film, with its latent images, in the dark chamber at the rear of the camera.

Figure 13 is a detail view, in section, at line 13 of Figure 12.

In order that the general assembly and arrangement of parts may readily be understood I have shown the camera with an outside casing C that is provided with a removable quick-detachable back-wall C', with a flat presser-plate 1, supported by two spring blades 2, 2 each having one end screwed to the back-wall and the other end fixed to the presser plate. A guide roller 3 is also journaled in brackets attached to the inner face of the removable back-wall, and the presser plate forms a resiliently supported guide for the film F to glide over, while the roller forms a rotary guide for the roll-film F.

The opposite ends of the removable back-wall are equipped with suitable fastening devices that may readily be released for removal of the back-wall in order that a standard type of film-pack P (Figures 1 and 2) may be loaded into or unloaded from the dark chamber at the rear of the camera. The back-wall C' forms one wall of this dark-chamber and an interior partition 4 (Figure 2) forms the remaining walls of this dark-chamber, the partition extending from end to end of the camera and enclosing the film-pack P or daylight spool as well as the winding spool W for the film, and located at the opposite end of the camera.

As best seen in Figure 2 the film passes from right to left, or reversely left to right, between the resiliently supported presser plate 1 and the partition 4, and the guide roller 3 of the back-wall is located adjacent a sprocket shaft 5 having a pair of sprockets 6, 6, for engagement with the perforations at the upper and lower edges of the roll-film, as indicated by dotted lines in Figure 1.

The film-pack P, with its interior ":daylight" spool D, and the film-winding spool W, are both removable from the dark-chamber of the camera, and they are retained in their respective, opposed positions, by means of releasable fastening devices mounted in the bottom wall of the casing. One of these devices forms an auxiliary re-winding head by means of which the exposed film, with its latent images, may be re-wound on the daylight spool D of the film pack P, without exposure to the light.

The standard film-pack P, or its interior spool D, is provided at its lower end with a socket 7 and a transversely extending pin 8 (Figure 4) and this daylight spool D is not only rotatable in one direction to permit advancing feed of the film, but the spool is also rotatable in the opposite direction to cause reverse travel of the film with its latent images, and re-winding of the film within the pack P. For this purpose I employ a re-winding head, exterior of the casing C and accessible for turning by hand, which re-winding head is mounted loosely in a bearing collar 9 seated in the bottom wall of the casing C, and retained also by co-action with the flange 10 of the back-wall C' when the latter is in closed position.

The re-winding head includes a rotatable pin 11, centrally mounted in the collar for longitudinal movement as well as rotary movement, and provided at its lower end, exterior of the casing, with a flat circular head 12, upon which is pivoted at 13 a U-shaped cam-yoke 14. Upon the upper end of the pin, within the casing, is mounted a notched socket-head 15 for engagement with the socket 7 and pin 8 of the daylight spool D of the film-pack P.

Below the socket-head 15 a bearing head 16 is mounted on the pin, and between this bearing head and the bottom 9' of the collar 9 a spring 16' is interposed and coiled about the pin.

Thus, as in Figure 4, it will be apparent that the U-shaped yoke may be swung from its horizontal position in Figure 6, to the depending position shown, and used as a handle for turning the enclosed "daylight spool" D to re-wind the film within the film-pack.

The pin 11 thus forms a bearing for the rotary movement of the film-spool or "daylight" spool D within the film-pack, as the spool and the notched socket-head 15 turn on the pin as a journal.

As disclosed in Figure 6, the lower bearing for the winding spool W is quite similar to the bearing for the rotary spool of the film-pack, but the bearing head of the winding spool W is not ordinarily rotatable. This bearing head includes a pin 26 with its upper end projecting into the ring-socket 27 of the spool, and the pin, which is provided with a head 28 within the casing, is also provided with another fixed head 29 exterior of the casing C and secured to the pin by screw 30. A base plate or bearing plate 31 is loosely mounted on the pin exterior of the casing C and this plate closes an opening in the bottom of the casing through which opening the pin extends. Between the head 28 and the bearing plate 31 a spring 32 is interposed and coiled about the pin, and a U-shaped cam-yoke 33 is pivoted at 34 on the cam head, so that, when the yoke is swung down on its pivot, against tension of spring 32, the bearing end of the pin 26 is withdrawn from the ring-socket 27 to free the lower end of the winding spool.

The upper end of the winding spool is fashioned with a transversely extending pin 35 with which two notches 36 in a coupling sleeve 37, co-act, and this sleeve, which is flanged at 38 to engage the spool, is secured by a screw 39 on the lower end of the main winding shaft 40 of the camera.

In Figure 2 it will be seen that the presser-plate 1 is located directly back of a central light-opening in the partition 4, which opening is complementary to a similar opening in the back wall of the central box A, located within the casing C, and this box forms the light chamber of the camera.

The film F in its movements passes between the presser plate and the partition 4, and the latter resiliently holds a portion of the film against the open-portion of the partition, to present a well-defined area of the film for exposure to the light rays coming from the light chamber A.

The sprocket wheel 6 which may be mechanically rotated and the guide roller 3, co-act to guide the film in its movement; to prevent buckling of the film; to relieve the film of strains due to winding and re-winding; and further, the sprockets, due to their location near the winding spool W assist in preventing accidental disengagement of the free end of the film after it has been tucked in under the retaining shield or friction plate W' of the winding spool W.

As best seen in Figure 2, the first or opening curtain 41 and the second or closing curtain 42, which together constitute the shutter, pass through a vertical space or plane located between the back face of the back wall of the light-chamber A and the front face of the partition 4 which forms part of the dark-chamber of the camera. The first or opening curtain is mounted at one end on an automatic, spring-wound curtain-roller 43, and the second or closing curtain 42 at one end is mounted on a second automatic spring-wound curtain roller 44, which rollers are journaled in two of the spaced frame plates 45 that are employed as an interior structure of the casing C.

Each of the curtains is provided with a spaced pair of tapes 46 which form extensions of the curtains, and these extensions, by their presence on the curtains, provide the necessary openings in the curtains to form the exposure slot of the shutter, so that the light rays may extend from the light chamber A through the light-openings described to make an exposure of a portion of the film, as the shutter flashes past these openings.

The spring-wound rollers are located at one side of and exterior of the light chamber, between said chamber and the film-pack compartment, and in making an exposure the curtains flash successively, to the right when released, in direction opposite to the advance or winding feed of the film F.

In setting the shutter, the first or opening curtain is mechanically wound upon a winding roller 48, and the second or closing curtain is wound upon another winding roller 47, located at one side of and exterior of the light chamber. These rollers, which are journaled in bearings of spaced frame plates 45, provided with winding pinions 49 and 50 respectively. For convenience in operating the winding rollers, the roller 48 is spaced in front of the roller 47, and the latter roller is provided with guide-rollers 51 for the tapes of the first curtain, as the closing curtain changes its direction of movement at this point.

The roll-film is fed or advanced, the shutter is set, and the focusing mirror is automatically turned from picture taking position to non-picture taking position or focusing position, through the instrumentality of the setting or winding lever 69 located exterior of the casing and above the camera body, at one side of the light chamber A. One swing of the lever in a horizontal plane through an arc of slightly less than 360 degrees is sufficient to set the mechanism, and the lever (when released) is automatically returned to its initial position against a stop 69' (Fig. 3) regardless of the length or degree of its working stroke of the lever.

As seen in Figure 6 this lever has an integral attaching head 70 that is firmly secured by screw 71 to the upper end of the sleeve 74 of the setting or driving mechanism, and an exposure indicating disk 70' is frictionally engaged within the head and provided with an annular series of marks or numbers to successively indicate the number of exposures that have been made. In this instance the disk has a capacity for indicating thirty six exposures of the film, and the disk has a couple of diametrically arranged pins 72 by means of which the disk may be set at zero. The disk is held by friction so that it will turn with the lever, but it is also rotatable relative to the lever in order that it may be turned, as by finger pressure against a pin 72, to bring the zero mark to position opposite to a stationary mark 73 (Figure 3) provided on the top face of the casing C adjacent the disk.

The exposure indicator is advanced one degree, that is, one number, upon each rotation of the lever 69 through its arc of movement about the shaft 40. The mechanism employed for this automatic indication is as follows, referring to Figures 15, 16, and 17; after a picture has been taken the lever 69 is swung about shaft 40 to set the mirror and the shutters for the next picture. Inasmuch as sleeve 74 is rotated directly by lever 69 against the tension of spring 75, motion is imparted thereby to cam arm 77. Cam arm 77 then engages the pin 81 secured on pivot arm 80 which pivot arm is adapted to engage and drive the star wheel 78. The initial movement of pin 81, however, due to the pivotal support of arm 80, is radial, that is, toward the star wheel, and the indicator disk, driven by frictional engagement with gear 97 which in turn is driven by pinions 96 and 93 and finally by the star wheel 78, does not move until the pin 81 causes the arm 80 to engage one of the points on the star wheel, and thus drive the same. A predetermined lost motion is thus effected in the drive of the indicator disk and the lever 69 moves farther around the shaft 40 than does the indicator disk. Through proper calculation, the mechanical movement has been arranged so that the lost motion referred to, results in the indicator disk rotating one mark less than the lever 69.

The disk 70' as well as the head 70 of the lever are mounted on a sleeve 74 that is rotatably secured upon shaft 40 by screw 71, so that the film-winding movement may be transmitted from the lever through the sleeve, a clutch, the shaft, and coupling 37, directly to the winding spool W, to advance the film.

The sleeve has rigidly attached thereto one end of a coiled spring 75, and the other end of this spring is attached to a post 76 standing erect above and rigid with one of the frame plates 45, and this spring which is wound under tension on the working stroke of the lever, automatically returns the lever to initial position when the thumb or finger is removed from the lever.

To transmit driving power from the sleeve to the shaft, and to prevent return or reverse movement of the winding spool W with the inactive stroke of the lever, I provide a clutch device between the sleeve and the shaft, which includes a cam arm 77 rigid with the lower end of the sleeve, and a toothed clutch disk 78 rigid with or keyed to the shaft 40 just below the cam arm 77. A clutch gear 79 is loosely journaled on the shaft beneath the clutch disk, and this gear has pivoted thereon a spring-pressed pawl 80 which is normally held out of engagement with the clutch disk, by its spring. A pin 81 is rigidly mounted on the pawl and located in the path of rotary movement of the cam arm 77.

On the working stroke of the lever, the sleeve and its cam arm 77 turn on the shaft until the arm engages the pin 81, and this engagement of parts forces the pawl 80 into engagement with one of the teeth of the clutch disk 78 thereby coupling together the sleeve and the shaft. When the lever swings on its return or inactive stroke, the cam arm 77 is withdrawn from the pin 81 thus permitting the pawl 80 to be automatically released from the clutch disk 78, and of course the shaft does not turn with the sleeve in its return movement.

The star or socket wheel 5—6, which engages the perforations along the upper and lower edges of the roll-film, is rotated or revolved coincident with the turning of the lever, and the main shaft 40, to assist in winding the film, and when the film is re-wound in the opposite direction, the star wheel or sprocket 5—6 also assists in this movement of the film.

For this purpose a gear 82 is keyed on the shaft 40 below the frame plate 45, and above the coupling 37, and this gear transmits power through an idler pinion 83 which is loosely journaled on a shaft depending from the frame plate, to a driven pinion 84 having a stub shaft 85 that projects into and is rigid with the tubular shaft 5 of the sprocket. At its lower end the sprocket shaft has a journal end free to rotate or revolve in the journal bearing 5' (Fig. 1) fixed to the bottom of the casing C. The sprockets 6, 6, are at all times engaged with the perforations of the film, and they revolve in either forward or reverse direction, depending on the movement of the film.

A reverse rotation of the shaft 40 is permitted for re-winding of the film with its latent images, from the winding spool W to the daylight spool D of the film-pack P. This reversal of rotation of the shaft and winding spool is accomplished while the clutch device is disengaged. The lever 69, sleeve 74, and spring 75 remain motionless when the film is being re-wound into the film-pack, and the re-winding is accomplished by turning the handle-yoke 14.

At the top of the camera, near the lever 69, a tubular control key 86, having a handle 87, is mounted to oscillate on a post 88 fixed to the frameplate 45. On the top face of the camera-casing appear the two letters R and V indicating respectively "reverse" and "advance" as related to the film.

When the key is turned so that its handle covers and obscures R, the film is being fed forward; and when the key is turned so that the handle covers and obscures the letter V, it will be understood that the film winding mechanism is in condition to be reversed, to permit re-winding of the film with its latent images.

The key 86, as seen in Figures 12 and 13, is journaled to turn or oscillate on its post, through a large arc of a circle, and the lower end of the tubular key is cut away to form a cam-shoulder 89 and a spaced stop-shoulder 90, the latter co-acting with a rigid stop pin 91 mounted on the plate 45 in the circular path of the key, to limit its movement.

To permit reversal in rotation of the shaft 40 without disturbing the position of the exposure-indicator 70', I build up a friction-resistance, in rotary gears and pinions, that prevents excessive freedom in the revsre movement of the spool W, and thus stabilizes the reverse motion of the film. By turing the key in the direction of the arrow in Figure 13, the cam shoulder 89 pushes against the free end of a one-way spring pressed pawl or ratchet 92 pivoted on the plate 45. In the advance feed position shown in Figure 13, the pawl is held by its spring S in engagement with a ratchet-pinion 93, to permit forward rotation of the shaft 40, but to prevent reverse rotation.

This pinion 93 which is in constant mesh with a drive gear 94 keyed on the shaft 40, is mounted on an upright shaft 95 journaled in bearings on the frame plate 45, and a second pinion 96 is mounted at the upper end of the pinion shaft 95 to constantly mesh with a driven gear 97 that is loosely journaled on the sleeve 74. As best seen in Figure 12, the exposure indicator 70' is mounted on the hub 98 of the driven gear 97, and while the indicator-disk is not mechanically fixed on the hub, it is in such adequate frictional engagement with the hub as to insure rotation of the indicator with the hub, relative to the head 70 of the lever and relative to the sleeve 74, when the film is being re-wound into its film pack.

The two curtains 41 and 42 of the shutter are wound from their automatic spring-wound rollers 43 and 44, and set simultaneously with the winding of the film on the spool W, by a single turn of the lever 69, and the clutch gear 79, loose on the shaft 40 but driven through the clutch, is utilized as the driving gear for setting the shutter-curtains.

The clutch gear 79, as best seen in Figure 18, engages a pinion 99 journaled on the frame plate 45. The pinion 99 meshes with the curtain pinion 50 of the roller 43 of the first or opening curtain 41, and the curtain pinion 50 meshes with a timing gear 100 keyed on the timing shaft 101. A second timing gear 102, loose on the shaft 101, but rotatable therewith, meshes with the curtain pinion 49 of the roller 47 for winding the second or closing curtain 42.

Gear 100 is provided with a depending pin 103, and gear 102 is provided with a pin 104 projecting up from its top surface in the path of movement of the pin 103, so that as the gear 100 is turned its pin 103 contacts with pin 104, as a coupling, to impart rotary movement to the gear 102 for winding the second or closing curtain-roller 47.

As best seen in Figure 10, the shutter setting gear 100 is rigid or integral with the lower end of a bushing 105, and a hollow, flanged, timing head 106 is loosely mounted to slide vertically and also to turn on the bushing, a spring 107 being coiled about the bushing, located in the hollow head, and interposed between a screw-head 108 and the hub of the slidable head.

The flanged, upper exposed face of the head or open-center disk 106 bears nine dots (Figure 3) indicating the variations in the time of exposure of the film, in fractions of seconds, for short time or high speed releasing of the shutter, and for longer time or slower exposure of the shutter. These nine dots are co-ordinated with a single relatively stationary dot on the head 108 of the screw that is threaded into the upper end of the gear shaft 101.

The timing head or disk may be lifted by hand against the tension of spring 107, and turned on the brushing as a center to set the time of exposure as indicated by the relation of the single dot on the screw head to one of the nine dots on the dial ring or flange of the head, as indicated in Figure 3.

A single timing pin 109 is fixed to or integral with the under face of the timing head, and this pin is adapted to register with and be inserted into a selected one of a complementary annular series of holes passing transversely through the shutter gear 100 as seen in Fig. 19, and this series of holes, it will be apparent, correspond to the nine dots on the dial ring. The pin 109 thus couples together the dial head or ring 106 and the first shutter roller-pinion 50. After the dial head has thus been adjusted for the time exposure, the shutter is set by turning the lever 69 as before described, and the set gears are held against rotation by means of a spring pressed pawl 110 that engages the pinion 99 (Figure 9).

To release the shutter-curtains from the driven connection with the shaft 40, the operating lever is provided with an arm 122 that contacts, as the lever is swung, with a pin 123 rigid with the free end of the spring pressed pawl 110 and depending through a slot in the frame plate 45 into the path of the arm. For control of the timing gears of the shutter curtains the lever arm 122 is provided with an upstanding pin 124 that projects upwardly through a slot in the frame plate 45, and actuates an escapement device comprising pivoted spring pressed detents located above the frame plate for co-action with the gears 100 and 102.

Having thus fully described my invention, what I claim as new and desire to secure by Letters Patent is:

1. In a camera of the roll film-type having shutters, the combination with a reversible film-winding spool, a rotary driving head for said spool and shutters, a single stroke operating lever mounted on the head, and a driving shaft on which the head is mounted, of a one-way clutch device comprising complementary clutch members mounted on the head and the shaft, means operable under control of said shutters for retaining one of said clutch members in driven position, and means for returning said clutch members to driving position.

2. In a camera of the roll-film type having shutters, the combination with a film-winding spool, a rotary driving head for said spool and shutters, a single stroke operating lever mounted on the head, and automatic means for returning the lever to initial position, of a drive shaft on which the head is mounted, a coupling between the shaft and the spool, and a one-way clutch device between the head and the shaft, means operable under control of said shutters for retaining one of said clutch members in driven position, and means for returning said clutch members to driving position.

3. In a camera of the focal plane shutter type, the combination with a drive shaft, a film spool, and power transmitting connections therebetween, of a sleeve rotatably secured on said shaft and an operating lever therefor, a clutch member on said sleeve, a co-acting clutch member rotatably mounted on said shaft, and means rigid with said shaft adapted to be driven by said latter clutch member whereby motion from said operating lever is transmitted to said spool.

4. In a camera, the combination with a drive shaft, a film spool, and power transmitting connections therebetween, of a sleeve rotatably secured on said shaft and an operating lever therefor, a clutch member on said sleeve having a cam-arm, a star wheel rigid with said shaft, a floating clutch member rotatable on said shaft and having a pawl pivotally mounted thereon, and a pin on said pawl in the path of said cam-arm whereby rotation of said cam-arm will operatively engage said pawl and star wheel to drive said shaft.

5. In a camera of the focal plane shutter type, the combination with a drive shaft, a film spool, and power transmitting connections therebetween, of a sleeve rotatably secured on said shaft and an operating lever therefor, a spring-retracted clutch member on said sleeve having a cam-arm, a star wheel rigid with said shaft, a floating clutch member rotatable on said shaft and having a pawl pivotally mounted thereon, a pin on said pawl in the path of said cam-arm whereby rotation of said cam-arm will operatively engage said pawl and star wheel to drive said shaft, and means co-acting with said shutter for returning said second clutch member to driving position.

6. In a camera of the notched, roll-film type, the combination with a film winding spool, a rotary driving head, a rotary exposure indicator and means for rotating the head spool and indicator, of means adapted to positively engage and feed said notched film, a power transmitting means between said head to rotate the indicator and said feeding means, and means in said device providing a lost motion whereby the said film is advanced only after an initial movement of said head.

7. In a camera of the notched, roll-film type, the combination with a film winding spool, a rotary driving head, a rotary exposure indicator and means for rotating the head spool and indicator, a pair of pinions having a shaft journaled in said camera, said pinions being adapted to positively engage and feed said notched film, and device including a gear train for transmitting power from said head to said pinions, and means in said device providing a lost motion whereby the said film is advanced only after an initial movement of said head to rotate the indicator.

8. In a camera of the notched, roll-film type, the combination with a film winding spool, a rotary driving head, and means for rotating the head and spool, of a pair of pinions having a shaft journaled in said camera and being adapted to positively engage and feed said notched film, device including a gear train for transmitting power from said head to said pinions, a spring-pressed pawl engaging said pinions to prevent retrograde movement thereof and cam means having an operable element exterior of the camera for releasing said pawl.

KARL NUCHTERLEIN.